(12) United States Patent
Stakoe et al.

(10) Patent No.: US 10,351,069 B2
(45) Date of Patent: Jul. 16, 2019

(54) GRAB HANDLE ASSEMBLY WITH RETRACTABLE ARTICLE HANGER

(71) Applicant: FORD GLOBAL TECHNOLOGIES, LLC, Dearborn, MI (US)

(72) Inventors: John Andrew Stakoe, Bloomfield Hills, MI (US); Jed Paul Durkin, Detroit, MI (US); Jeff Todd Baxter, Carleton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 11 days.

(21) Appl. No.: 15/207,103

(22) Filed: Jul. 11, 2016

(65) Prior Publication Data

US 2018/0009388 A1    Jan. 11, 2018

(51) Int. Cl.
*B60R 7/10* (2006.01)
*B60N 3/02* (2006.01)

(52) U.S. Cl.
CPC .................. *B60R 7/10* (2013.01); *B60N 3/02* (2013.01); *B60N 3/023* (2013.01)

(58) Field of Classification Search
CPC .............. B60R 7/10; B60N 3/023; B60N 3/02

USPC ................ 296/1.02, 214, 37.7; 224/313, 927
See application file for complete search history.

(56) References Cited

U.S. PATENT DOCUMENTS

| | | | | |
|---|---|---|---|---|
| 5,147,078 A | * | 9/1992 | Flieder | B60R 7/10 211/119.1 |
| 6,643,897 B2 | * | 11/2003 | Chang | B60N 3/023 16/248 |
| 6,908,269 B1 | * | 6/2005 | Youngs | B60P 7/0807 410/100 |
| 8,052,188 B2 | * | 11/2011 | Chernoff | B60N 3/023 296/1.02 |
| 2002/0077020 A1 | | 6/2002 | Graf et al. | |
| 2010/0072314 A1 | * | 3/2010 | Sherman | D06F 53/045 242/388.91 |
| 2012/0193383 A1 | * | 8/2012 | Ludwig | B60N 3/023 224/539 |

* cited by examiner

*Primary Examiner* — Joseph D. Pape
*Assistant Examiner* — Dana D Ivey
(74) *Attorney, Agent, or Firm* — Vichit Chea; King & Schickli PLLC

(57) ABSTRACT

A grab handle assembly is provided for a motor vehicle. That grab handle assembly includes a grab handle, a reel, a line wound on the reel and an anchor point for the line when the line is extended from the reel.

18 Claims, 3 Drawing Sheets

GRAB HANDLE ASSEMBLY WITH RETRACTABLE ARTICLE HANGER

TECHNICAL FIELD

This document relates generally to the motor vehicle equipment field and, more particularly, to a grab handle assembly incorporating a retractable article hanger.

BACKGROUND

It is well known in the art to equip a motor vehicle with an article hanger or coat hook in the area of the headliner. In many applications, the article hanger or coat hook is integrated into a grab handle assembly provided above the rear door openings of the motor vehicle. Examples of such structures are shown in, for example, U.S. Pat. Nos. 9,266,477, 8,827,516 and 8,210,597.

This document relates to a grab handle assembly incorporating an article hanger in the form of a retractable line that may be easily deployed for use or easily stowed as desired.

SUMMARY

In accordance with the purposes and benefits described herein, a grab handle assembly is provided for a motor vehicle. That grab handle assembly comprises a grab handle, a reel, a line wound on that reel and an anchor point for the line when the line is extended from the reel. The reel and the anchor point may be provided inboard the handle so as to provide a useful yet compact structure.

In accordance with an additional aspect, the grab handle assembly comprises a base. A grab handle, a reel and an anchor point are all carried on the base. Further a line is wound on the reel. Advantageously, the line may be deployed from the reel to extend between the reel and the anchor point and thereby provide a useful article hanger.

The grab handle assembly may further include a stop carried on the line. Further, the anchor point may include a receiver that engages at least one of the line and the stop when the line is extended from the reel into the deployed position. Still further, the anchor point may include a lug having a slot that receives and holds the line when the line is extended from the reel. Further, the stop may engage the lug when the line is received and held in the slot.

Still further, the grab handle assembly may also include a pivot connecting the grab handle to the base. That pivot may include a first hinge assembly at a first end of the grab handle and a second hinge assembly at a second end of the grab handle. In such an embodiment, the reel and the anchor point may both be inboard of the first hinge assembly and the second hinge assembly.

In accordance with yet another aspect, an article hanger is provided for a motor vehicle. That article hanger comprises a base, a reel carried on the base and an anchor point carried on the base. A line is wound onto the reel. The line is extended from the reel so as to extend between the reel and the anchor point.

The article hanger may further include a stop carried on the line. In addition, the anchor point may include a receiver that engages at least one of the line and the stop when the line is extended from the reel. Still further, the anchor point may include a lug having a slot that receives and holds the line when the line is extended from the reel. Further, the stop may engage the lug when the line is received and held in the slot.

In the following description, there are shown and described several preferred embodiments of the grab handle assembly and article hanger. As it should be realized, the grab handle assembly and the article hanger are capable of other, different embodiments and their several details are capable of modification in various, obvious aspects all without departing from the grab handle assembly and article hanger as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the grab handle assembly and article hanger and together with the description serve to explain certain principles thereof. In the drawing figures.

Figure 1:
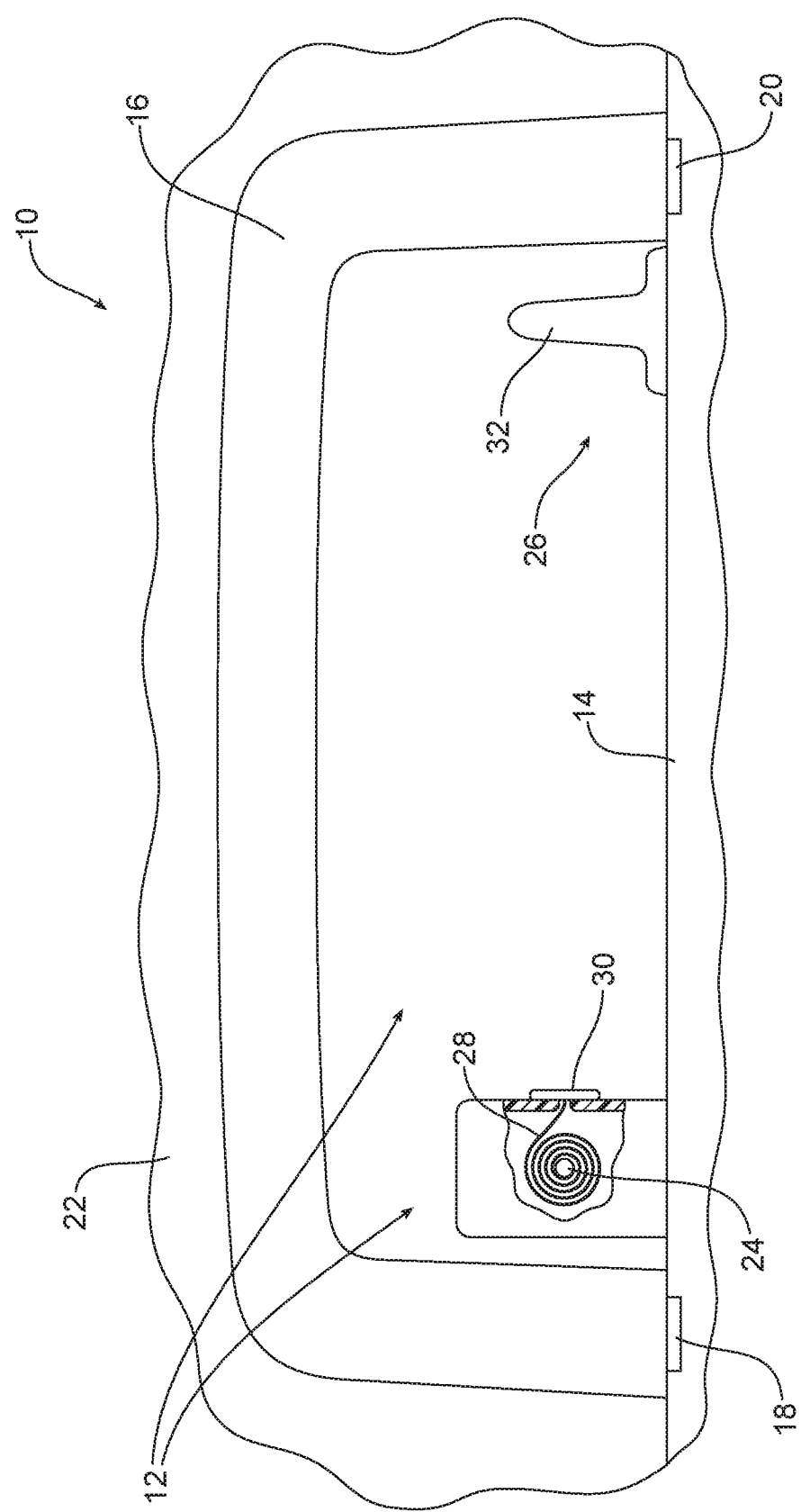
FIG. 1 is a side elevational view of the grab handle assembly illustrating the article hanger of that grab handle assembly in the stowed or retracted position.

Reference will now be made in detail to the present preferred embodiments of the grab handle assembly and the article hanger, examples of which are illustrated in the accompanying drawing figures.

DETAILED DESCRIPTION

Reference is now made to FIGS. 1-4 illustrating the grab handle assembly 10 which incorporates an article hanger generally designated by reference numeral 12.

Figure 2:
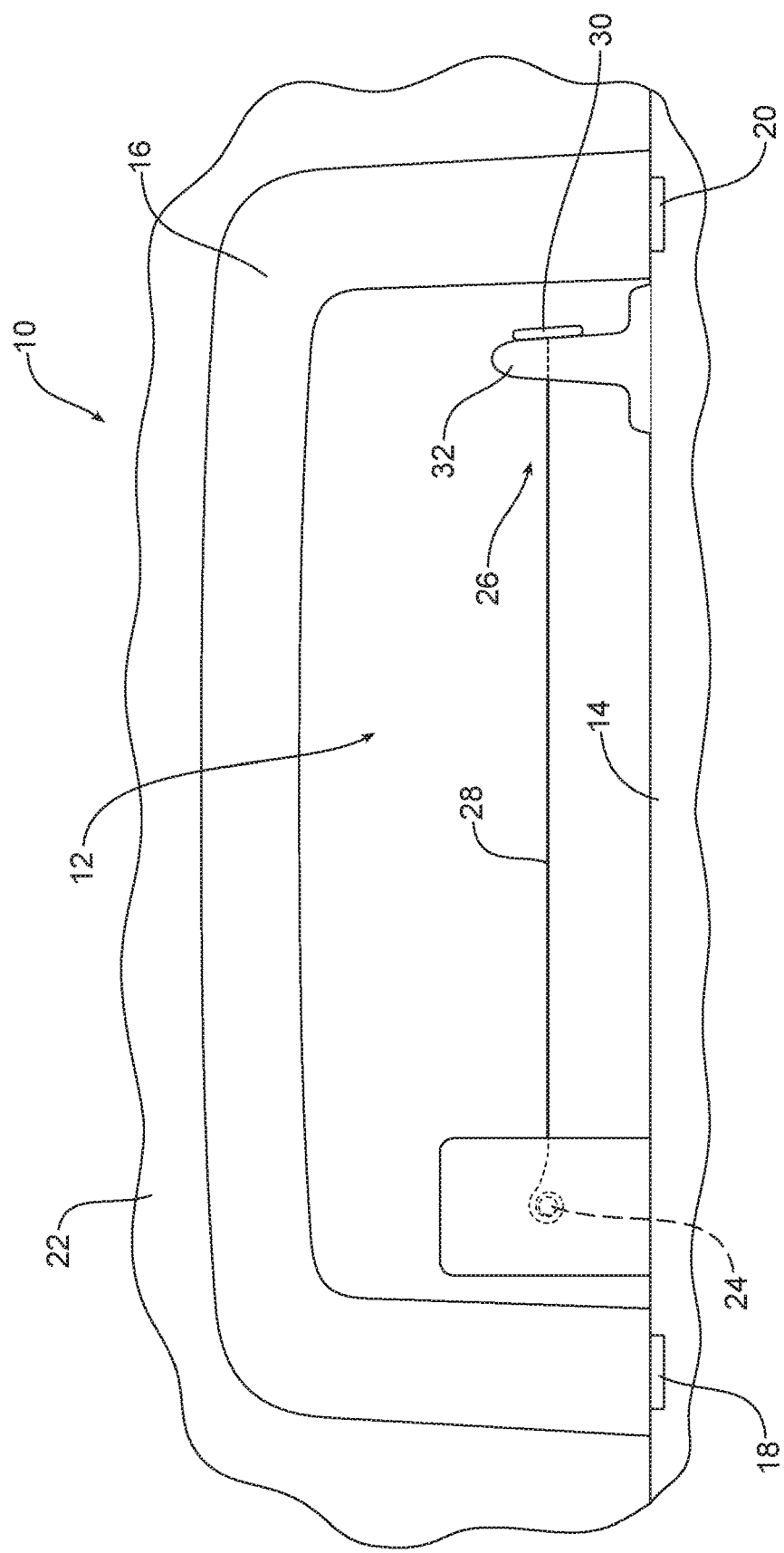
FIG. 2 is a view similar to FIG. 1 but showing the article hanger of the grab handle assembly in the extended or deployed position so that the line extends between the reel and the anchor point inboard of the ends of the grab handle.

As illustrated, the grab handle assembly 10 includes a base 14 by which the grab handle assembly is anchored through the headliner 22 to the roof sheet metal (not shown) of the motor vehicle by fasteners (not shown). A grab handle 16 is carried on the base 14. In the illustrated embodiment, the grab handle 16 is pivotally connected to the base 14 by means of a pivot including a first hinge assembly 18 at a first end of the grab handle and a second hinge assembly 20 at a second end of the grab handle. As illustrated in FIGS. 1 and 2, the grab handle 16 is pivoted into the stowed position against the headliner 22. It should be appreciated that the grab handle 16 may be pivoted away from the headliner 22 about the two hinge assemblies 18, 20 when desired. Here it should be appreciated that the two hinge assemblies 18, 20 may both be spring loaded to bias the grab handle into the stowed position.

The article hanger 12 includes a reel 24 and an anchor point 26 that are carried on the base 14. A line or cable 28 is wound onto the reel 24. The distal end of the line 28 includes a stop 30.

Figure 3:
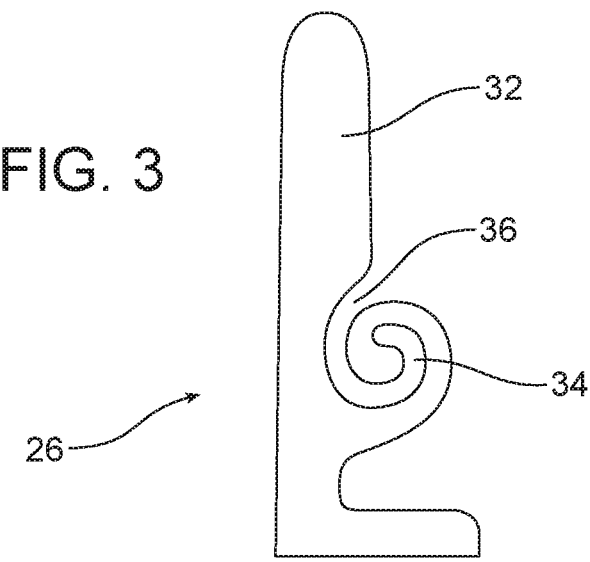
FIG. 3 is a detailed view of one possible embodiment of the anchor point.
Figure 4:
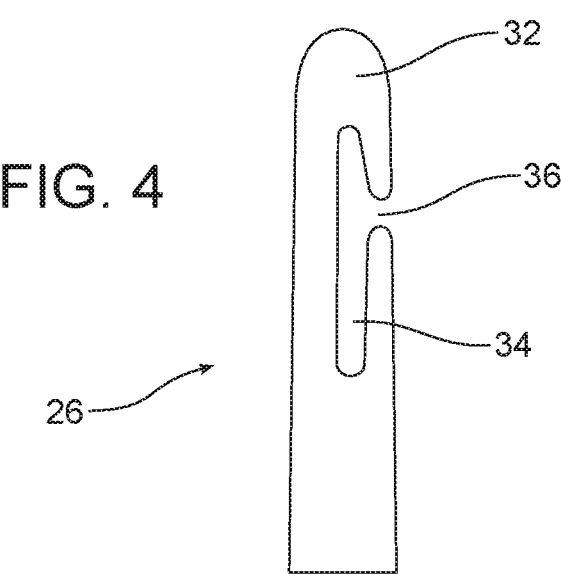
FIG. 4 is a detailed view of an alternative possible embodiment of the anchor point.

The anchor point 26 includes a lug 32 that includes a slot or receiver 34. As illustrated in FIG. 3, the slot 34 is shaped similar to the number "6." Here it should be appreciated that the slot 34 may take other configurations such as that illustrated in FIG. 4. As will become apparent from the following description, the slot 34 receives and holds the line 28 when the line is extended from the reel 24.

Reference is now made to FIG. 1 illustrating the article hanger 12 in the stowed position with the line 28 fully wound on the reel 24 and the stop 30 abutting the base 14 in which the reel is held.

Reference is now made to FIG. 2 illustrating the article hanger 12 in the deployed position wherein the line 28 is paid out from the reel 24 and extends between the reel and the anchor point 26 with the line 28 extending through the slot 34 and the stop 30 engaging the side of the lug 32. One may hook a coat hanger or clip an article to the article hanger 12 and more specifically, the line 28 of the article hanger between the reel 24 and the lug 32 when the article hanger is in the deployed position illustrated in FIG. 2.

After use, the article hanger 12 may be returned to the stowed position by sliding the line 28 through the slot 34 and out of the slot entryway 36. Once the line 28 and stop 30 are free of the anchor point 26, the spring loaded reel 24 takes up the line 28 until the stop 30 is again in engagement with the base 14 in which the reel is held.

The grab handle assembly 10 and the article hanger 12 provide a number of benefits and advantages. When extended between the reel 24 and the anchor point 26, the line 28 provides a relatively wide expanse for hanging coat hangers, clips and other articles suited for a wide range of applications. The grab handle assembly 10 and article hanger 12 also provide an aesthetically pleasing appearance when the article hanger is in the stowed position.

Still further, it should be appreciated that the entire article carrier 12, including the reel 24, the anchor point 26 and the line 28 that is extended between the reel and the anchor point is contained completely inboard of the grab handle 16 between the first hinge assembly 18 and the second hinge assembly 20. Accordingly, the article hanger 12 is a relatively compact structure that does not require a great deal of space. Further, it should be noted that the grab handle assembly 10 and article hanger 12 are relatively inexpensive to produce and very easy to use.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A grab handle assembly for a motor vehicle, comprising:
    a grab handle, wherein said grab handle includes a first hinge assembly at a first end and a second hinge assembly at a second end;
    a reel;
    a line wound on said reel; and
    an anchor point for said line when said line is extended from said reel, wherein said reel, said line and said anchor point are contained completely inboard of said grab handle between said first hinge assembly and said second hinge assembly when said line is extended.

2. The grab handle assembly of claim 1, further including a stop carried on said line.

3. The grab handle assembly of claim 2, wherein said anchor point includes a receiver that engages at least one of said line and said stop when said line is extended from said reel.

4. The grab handle assembly of claim 2, wherein said anchor point includes a lug having a slot that receives and holds said line when said line is extended from said reel.

5. The grab handle assembly of claim 4, wherein said stop engages said lug when said line is received and held in said slot.

6. A grab handle assembly for a motor vehicle, comprising:
    a base;
    a grab handle carried on said base;
    a reel carried on said base;
    a line wound on said reel; and
    an anchor point carried on said base and spaced from said reel such that said line is deployed from said reel to extend between said reel and said anchor point in a substantially straight line substantially along a length of the grab handle.

7. The grab handle assembly of claim 6, further including a stop carried on said line.

8. The grab handle assembly of claim 7, wherein said anchor point includes a receiver that engages at least one of said line and said stop when said line is extended from said reel.

9. The grab handle assembly of claim 7, wherein said anchor point includes a lug having a slot that receives and holds said line when said line is extended from said reel.

10. The grab handle assembly of claim 9, wherein said stop engages said lug when said line is received and held in said slot.

11. The grab handle assembly of claim 10, further including a pivot connecting said grab handle to said base.

12. The grab handle assembly of claim 11, wherein said pivot includes a first hinge assembly at a first end of said grab handle and a second hinge assembly at a second end of said grab handle.

13. The grab handle assembly of claim 12, wherein said reel and said anchor point are inboard said first hinge assembly and said second hinge assembly.

14. An article hanger for a motor vehicle, comprising:
    a base;
    a grab handle carried on said base, wherein said grab handle includes a first hinge assembly at a first end and a second hinge assembly at a second end;
    a reel carried on said base;
    an anchor point carried on said base; and
    a line wound onto said reel wherein said line is extended from said reel so as to extend between said reel and said anchor point and said line is contained completely inboard of the grab handle between the first hinge assembly and the second hinge assembly, whereby said anchor point engages a distal end of the line.

15. The article hanger of claim 14, further including a stop carried on said line.

16. The article hanger of claim 15, wherein said anchor point includes a receiver that engages at least one of said line and said stop when said line is extended from said reel.

17. The article hanger of claim 15, wherein said anchor point includes a lug having a slot that receives and holds said line when said line is extended from said reel.

18. The article hanger of claim 17, wherein said stop engages said lug when said line is received and held in said slot.

* * * * *